(12) United States Patent
Haglund et al.

(10) Patent No.: US 9,224,242 B2
(45) Date of Patent: Dec. 29, 2015

(54) AUTOMATED THREE DIMENSIONAL MAPPING METHOD

(75) Inventors: Leif Haglund, Brokind (SE); Johan Borg, Linköping (SE); Ingemar Andersson, Linköping (SE); Folke Isaksson, Linköping (SE)

(73) Assignee: SAAB AB, Linköping (SE)

( * ) Notice: Subject to any disclaimer, the term of this patent is extended or adjusted under 35 U.S.C. 154(b) by 652 days.

(21) Appl. No.: 13/575,454

(22) PCT Filed: Jan. 26, 2010

(86) PCT No.: PCT/SE2010/000015
§ 371 (c)(1),
(2), (4) Date: Oct. 16, 2012

(87) PCT Pub. No.: WO2011/093752
PCT Pub. Date: Aug. 4, 2011

(65) Prior Publication Data
US 2013/0027519 A1    Jan. 31, 2013

(51) Int. Cl.
*H04N 13/02* (2006.01)
*G06T 17/05* (2011.01)
*G06T 7/00* (2006.01)

(52) U.S. Cl.
CPC ............ *G06T 17/05* (2013.01); *G06T 7/0071* (2013.01); *G06T 2207/10032* (2013.01)

(58) Field of Classification Search
CPC .............. G06T 17/05; G06T 2207/10032; G06T 7/0071
USPC .......................................................... 348/46
See application file for complete search history.

(56) References Cited

U.S. PATENT DOCUMENTS

| | | | |
|---|---|---|---|
| 5,104,217 | A | 4/1992 | Pleitner et al. |
| 5,270,756 | A | 12/1993 | Busenberg |
| 5,808,626 | A | 9/1998 | Givens et al. |

(Continued)

FOREIGN PATENT DOCUMENTS

| | | | |
|---|---|---|---|
| EP | 0 907 144 A2 | 4/1999 |
| EP | 1 209 623 A2 | 5/2002 |

(Continued)

OTHER PUBLICATIONS

PT/ISA/210—International Search Report—September 28, 2010.

(Continued)

*Primary Examiner* — Tat Chio
*Assistant Examiner* — Nguyen Truong
(74) *Attorney, Agent, or Firm* — Venable LLP; Jeffri A. Kaminski

(57) ABSTRACT

An automated three dimensional mapping method estimating three dimensional models taking advantage of a plurality of images. Positions and attitudes for at least one camera are recorded when images are taken. The at least one camera is geometrically calibrated to indicate the direction of each pixel of an image. A stereo disparity is calculated for a plurality of image pairs covering a same scene position setting a disparity and a certainty measure estimate for each stereo disparity. The different stereo disparity estimates are weighted together to form a 3D model. The stereo disparity estimates are reweighted automatically and adaptively based on the estimated 3D model.

14 Claims, 3 Drawing Sheets

(56) References Cited

U.S. PATENT DOCUMENTS

| | | |
|---|---|---|
| 6,118,475 A | 9/2000 | Iijima et al. |
| 6,175,648 B1 | 1/2001 | Ayache et al. |
| 6,658,207 B1 | 12/2003 | Partynski et al. |
| 2002/0081019 A1 | 6/2002 | Katayama et al. |
| 2002/0101438 A1 | 8/2002 | Ham et al. |
| 2002/0163582 A1 | 11/2002 | Gruber et al. |
| 2004/0105090 A1 | 6/2004 | Schultz et al. |
| 2009/0265193 A1 | 10/2009 | Collins et al. |
| 2010/0231583 A1 | 9/2010 | Furukawa et al. |

FOREIGN PATENT DOCUMENTS

| | | |
|---|---|---|
| EP | 1612733 A2 | 1/2006 |
| EP | 1959392 A1 | 8/2008 |
| EP | 2076055 A1 | 7/2009 |
| JP | 7-254074 A | 10/1995 |
| JP | 8-43055 A | 2/1996 |
| JP | 08-159762 A | 6/1996 |
| JP | 9-305796 A | 11/1997 |
| JP | 2003167931 A | 6/2003 |
| JP | 2008186145 A | 8/2008 |
| JP | 2009-32122 A | 2/2009 |
| WO | WO-00/72075 A1 | 11/2000 |
| WO | WO-2009/003529 A1 | 1/2009 |

OTHER PUBLICATIONS

PCT/ISA/237—Written Opinion of the International Searching Authority—Sep. 28, 2010.

European Supplemental Search Report issued in European Patent Application No. 10 84 4834 dated Oct. 15, 2013.

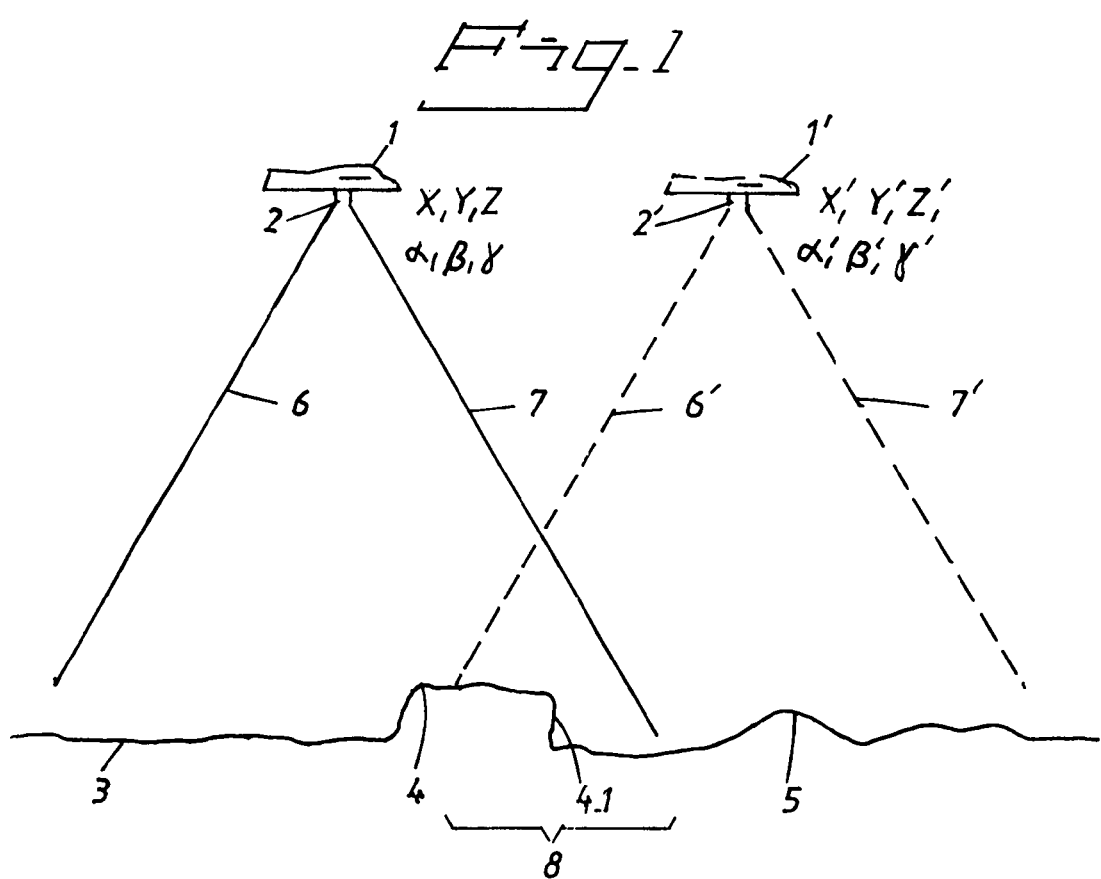

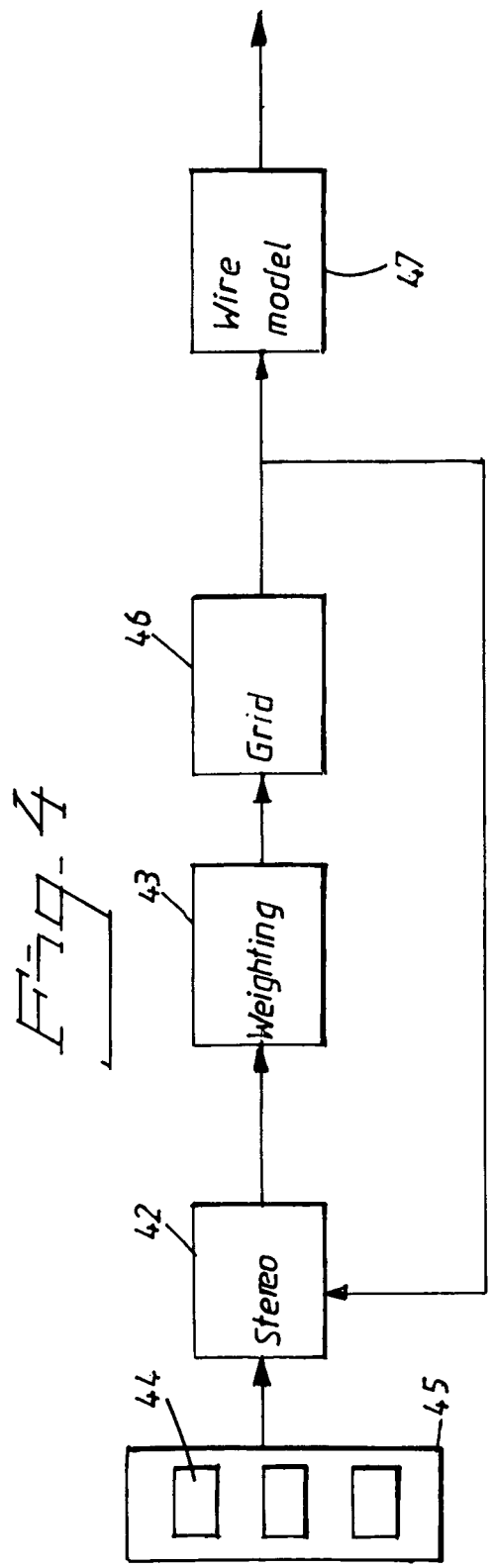

AUTOMATED THREE DIMENSIONAL MAPPING METHOD

CROSS-REFERENCE TO RELATED APPLICATIONS

This application is the national phase under 35 U.S.C. §371 of PCT/SE2010/000015 filed 26 Jan. 2010.

TECHNICAL FIELD

The present invention relates to an automated three dimensional mapping method estimating three dimensional models taking advantage of a plurality of images.

BACKGROUND

Estimation of three dimensional, 3D, models from stereo photogrammetric methods is generally known in connection to manual utilization of stereo goggles. There are also solutions utilizing computers and examples of such computerized solutions are inter alias found in our patent applications PCT/EP2007/056780 and PCT/SE2000/000739. Classically the result is based on two images taken from different positions covering the same scene in the world.

From U.S. Pat. No. 5,808,626 and US 2002/0101438 A1 methods using multi overlapping images are known. These methods are based on identifying and selection of key points. Other examples of methods using overlapping images are known from U.S. Pat. No. 6,658,207 B1, US 2004/0105090 A1, US 2002/0163582 A1 and U.S. Pat. No. 5,104,217.

To get accuracy in the automated estimates it is normally required to introduce some kind of smoothing scheme. A drawback with such smoothing is that sharp changes in depth will be smoothed and the overall quality of the 3D model will be very blurred.

It is an object of this invention to obtain a method reducing the need of smoothing resulting in a more stable 3D model requiring none or very little post smoothing.

SUMMARY OF THE INVENTION

The object is obtained by a method characterized in that the positions and attitudes for at least one camera is recorded when images are taken, that at least one camera is geometrically calibrated to indicate the direction of each pixel in an image, that a stereo disparity is calculated for a plurality of image pairs covering a same scene position setting a disparity and a certainty measure estimate for each stereo disparity, that the different stereo disparity estimates are weighted together to form a 3D model, and that the stereo disparity estimates are reweighted automatically and adaptively based on the estimated 3D model.

Our mapping method relies on that the 3D models cover the whole area covered by collected images without selection of key points or segmentation of objects.

By calculating the stereo disparity for a plurality of image pairs covering the same scene position according to the preceding paragraph no or only slight post smoothing is to be carried out to obtain a stable 3D model. By using several different images taken from different angles following a voting or weighting scheme it is possible to combine the results from stereo pairs to a three dimensional model that will be smooth where the world is smooth, like on a street, and that simultaneously at sharp depth changes can be kept sharp. The stereo disparity estimates could for example be reweighted based on normal vectors of the estimated 3D model. Furthermore the different stereo disparity estimates could be weighted together to form a 3D height model.

According to a preferred development of the method a stereo disparity is calculated for each possible image pair. By taking advantage of as many image pairs as possible the 3D model is optimized with respect to accuracy.

According to a still preferred development of the method images in the direction of flight are taken with an overlap of approximately 60-90%.

According to another preferred development of the method the images between adjacent flights are taken with an overlap of approximately 60-80%.

The choice of overlaps as proposed above as to direction of flight and between adjacent flights results in that a coverage of at least 10 images are available for contribution to the estimates for each point in the scene.

In order to further increase the number of images available it is proposed according to yet another preferred development of the method that images are taken with overlap in two essentially perpendicular directions of flight.

The weighting of the disparity estimates can be performed in many different ways. According to one proposal of the method the weighting of the stereo disparities are based on averaging. To avoid uncertain measurements it is also proposed that the weighting of the stereo disparities involves excluding of outliers.

The certainty measure estimate for each stereo disparity can be set in consideration of local contrast, visibility affected for example by obscuration or resolution or a mixture of these considerations.

BRIEF DESCRIPTION OF THE DRAWINGS

The invention will now be described in more detail with reference to the accompanying drawings in which:

FIG. 1 schematically illustrates the capturing of images from above.

FIG. 4 schematically illustrates image processing involved in the 3D mapping method according to the invention.

DETAILED DESCRIPTION

Figure 2A:
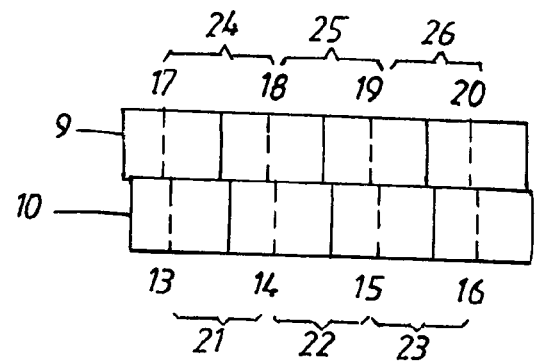
FIG. 2a illustrates an example of a known stereo scheme used to collect data.

According to FIG. 1 an air plane 1 provided with a camera 2 is shown in a first position by unbroken lines and in a second position by broken lines above a landscape 3. As illustrated in the figure the landscape differs in height and there are abrupt configurations 4 such as houses and more billowing configurations 5 such as billowing hills. The position of the camera in the first position is denoted by x, y, z and the attitude by $\alpha$, $\beta$, $\gamma$. Accordingly, all six degrees of rotation and position are available. The corresponding position and attitude for the second camera position shown are denoted by x', y', z' and $\alpha'$, $\beta'$, $\gamma'$. The coverage of the landscape by the camera 1 is indicated by lines 6, 7 for the first position and 6', 7' for the second position. When comparing an image of the landscape taken from the first position with an image taken from the second position an overlapping section 8 can be identified. If the overlapping 8 section is observed, it can be seen that an image taken from the first position lacks image information about the vertical right part 4.1 of the abrupt configuration 4, while the same vertical right part 4.1 is easily imaged from the second position. Accordingly, being in possession of a plurality of images covering the same scene position, increases the possibilities to build up three dimensional images coinciding closer with the real world.

In FIG. 1 there is shown an overlap of about 25%. Of course this overlap could be much higher such as for example 75%.

FIG. 2a shows an example of a known stereo scheme. Such a scheme is obtained by flying an air plane or other airborne vehicle provided with a downwards looking camera above the landscape such that there is an overlap of about 50-60% in the direction of flight and for adjacent flights principally without overlap and in practice about 10% in order to avoid holes. In the figure an upper gray strip 9 illustrates the footprints of a first flight and a lower gray strip 10 the footprints of a second flight. In the strips 9, 10 the footprints from every second image are illustrated as solid rectangles 13-20 while the footprints from every second image in between are illustrated as rectangles 21-26 delimited by dashed lines perpendicular to the flight direction 12. By the scheme shown each point on the ground is covered with two images and from these images stereo estimates can be calculated.

Figure 2B:
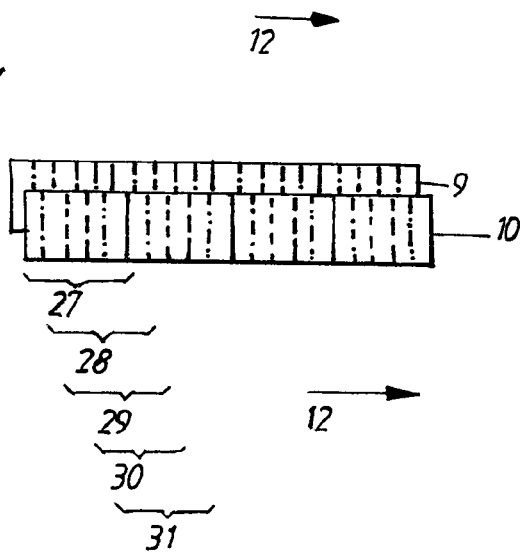
FIG. 2b illustrates a proposed stereo scheme to be used to collect data.

FIG. 2b shows an example of a stereo scheme that can be used in our proposed invention. In the proposed scheme the upper and lower strips 9, 10 illustrates an overlap of 80% in the direction of flight 12 and an overlap between adjacent flights of 60%. Suitable proposed overlapping in the flight direction is about 60-90% and about 60-80% between adjacent flights. In the different strips 9, 10 five different rectangles 27-31 can be identified illustrating five consecutive footprints that are repeatably present along the flight direction. The five rectangles are indicated by five different delimiting lines (solid, dash-dotted, short-dashed, long-dashed, and dash-double-dotted) perpendicular to the flight direction. By the scheme as shown and described with reference to FIG. 2b each point on the ground is covered with at least 10 images and all these images can contribute to the stereo estimates for each point in the scene. The number could be at least 15 with an overlap of 67% sidewise.

Figure 3:
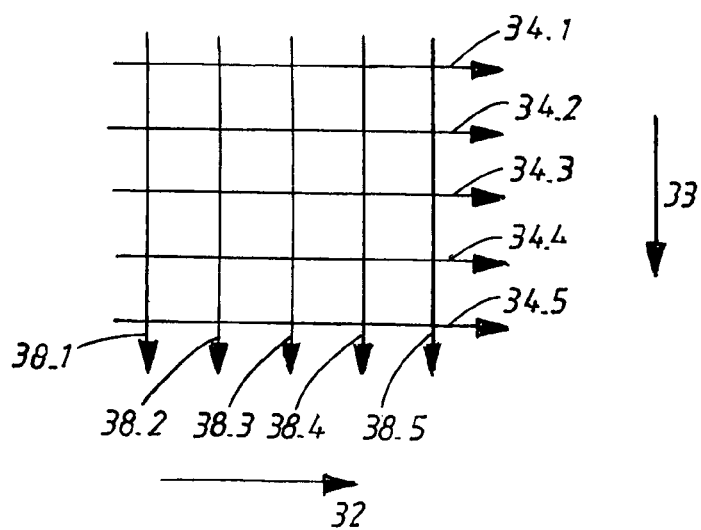
FIG. 3 more schematically illustrates another proposed scheme to be used to collect data.

FIG. 3 schematically shows an example of a scheme offering still more overlapping. In this case images are collected not only from essentially parallel flight paths in one and first flight direction 32 but also in a second flight direction 33 essentially perpendicular to the first flight direction. The flights are here only indicated as arrows 34.1-34.5 in the first flight direction 32 and arrows 38.1-38.5 in the second flight direction 33. Even though the arrows are shown pointing in the same direction for a flight direction some of them, for example, every second could be pointing in the opposite direction. The overlapping between adjacent parallel flights and overlapping in the flight direction are not particularly shown in FIG. 3 but can be varied as described with reference to FIG. 2b within wide frames. For example each point on the ground can be covered by at least 20 images that can contribute to the stereo disparity estimates for each point in the scene.

The image processing involved in the 3D mapping method of the invention is now described with reference to FIG. 4.

Images 44 collected according to the description above with reference to the FIGS. 1, 2b and 3 and that can be available in a storing unit 45 are applied to a stereo disparity block 42 calculating a stereo disparity for each possible image pair n covering the same scene position. For each image involved the position x, y, z and the attitude $\alpha, \beta, \gamma$ from which the image is taken are known, i.e. all six degrees of rotation and position are known. Furthermore, a measure of the certainty for each stereo disparity is estimated. This measure can be based upon local contrasts, visibility and/or resolution.

The stereo disparities calculated in the stereo disparity block 42 are subjected to a weighting process in a weighting block 43 taking notice of estimated certainty measures. Available as an output of the weighting block 43 after weighting is a height model 46 that can be visualised as a grid. From this first model the original stereo estimates are reweighted automatically and adaptively based on normal vectors of the estimated 3D model taking information such as visibility, local contrast, resolution and visibility such as obscuration into consideration. In this connection for example an image taken straight above a building is used to estimate the roof structure and not the sides of a building. Another example could be to avoid mixing of the front side and back side of buildings. By an iterative process taking advantage of images from aside and connected measurements a more reliable 3 D model is obtained disclosing hidden sections. In the weighting process outliers can be sorted out and as a straight forward example the remaining stereo disparities for a scene are weighted together by averaging or other mathematical methods to find a concentration of similar stereo disparities.

Based upon the 3D model 46 on the output of the weighting block 43 a wire model 47 of triangles is built up and the triangles are draped with images fitting the direction of viewing.

The invention is not limited to the method exemplified above but may be modified within the scope of the attached claims.

The invention claimed is:

1. An automated three dimensional mapping method estimating three dimensional models covering the whole area covered by collected images without selection of key points or segmentation of objects and taking advantage of a plurality of images, the method comprising:
   recording positions and attitudes for at least one camera when images are taken along a path;
   geometrically calibrating at least one camera to indicate the direction from each pixel in an image;
   calculating a pixel wise stereo disparity for a plurality of image pairs covering a same scene position setting a disparity and a certainty measure estimate for each stereo disparity;
   weighing together the different stereo disparity estimates based on the certainty measures to form a 3D model, wherein the certainty measure estimate for each disparity is set in consideration of resolution, local contrast, or visibility; and
   automatically and adaptively reweighing the stereo disparity estimates based on the estimated 3D model and the certainty measures, wherein said reweighing is based on the normal vectors of the estimated 3D model.

2. The method according to claim 1, wherein different stereo disparity estimates are weighted together to form a 3D height model.

3. The method according to claim 1, wherein a stereo disparity is calculated for each possible image pair.

4. The method according to claim 1, wherein images in the direction of the path are taken with an overlap of approximately 60-90%.

5. The method according to claim 1, wherein the images between adjacent paths are taken with an overlap of approximately 60-80%.

6. The method according to claim 1, wherein images are taken with overlap in two essentially perpendicular directions of the paths.

7. The method according to claim 1, wherein the certainty measure estimate for each disparity is set in consideration of resolution.

8. The method according to claim 1, wherein the weighting of the stereo disparities involves excluding of outliers.

9. The method according to claim 1, wherein the weighting of the stereo disparities are based on averaging.

10. The method according to claim 1, wherein the certainty measure estimate for each stereo disparity is set in consideration of local contrast.

11. The method according to claim 1, wherein the certainty measure estimate for each disparity is set in consideration of visibility affected for example by obscuration.

12. An automated three dimensional mapping method estimating three dimensional models covering the whole area covered by collected images without selection of key points or segmentation of objects and taking advantage of a plurality of images, the method comprising:
   recording positions and attitudes for at least one camera when images are taken along a path;
   geometrically calibrating at least one camera to indicate the direction from each pixel in an image;
   calculating a pixel wise stereo disparity for a plurality of image pairs covering a same scene position setting a disparity and a certainty measure estimate for each stereo disparity;
   weighing together the different stereo disparity estimates based on the certainty measures to form a 3D model, wherein the certainty measure estimate for each disparity is set in consideration of resolution, local contrast, or visibility; and
   automatically and adaptively reweighing the stereo disparity estimates based on the estimated 3D model and the certainty measure.

13. An automated three dimensional mapping method estimating three dimensional models covering the whole area covered by collected images without selection of key points or segmentation of objects and taking advantage of a plurality of images, the method comprising:
   recording positions and attitudes for at least one camera when images are taken along a path;
   geometrically calibrating at least one camera to indicate the direction from each pixel in an image;
   calculating a pixel wise stereo disparity for a plurality of image pairs covering a same scene position setting a disparity and a certainty measure estimate for each stereo disparity;
   weighing together the different stereo disparity estimates based on the certainty measures to form a 3D model, wherein the certainty measure estimate for each disparity is set in consideration of resolution, local contrast, or visibility; and
   automatically and adaptively reweighing the stereo disparity estimates based on the estimated 3D model and the certainty measures, wherein said reweighing is based on the normal vectors of the estimated 3D model.

14. Method according to claim 1 wherein no post smoothing is carried out to obtain a stable 3D model.

\* \* \* \* \*